United States Patent [19]

Beerends

[11] Patent Number: 5,321,636
[45] Date of Patent: Jun. 14, 1994

[54] METHOD AND ARRANGEMENT FOR DETERMINING SIGNAL PITCH

[75] Inventor: John G. Beerends, The Hague, Netherlands

[73] Assignee: U.S. Philips Corporation, New York, N.Y.

[21] Appl. No.: 19,811

[22] Filed: Feb. 4, 1993

Related U.S. Application Data

[63] Continuation of Ser. No. 939,386, Aug. 31, 1992, abandoned, which is a continuation of Ser. No. 487,462, Feb. 28, 1990, abandoned.

[30] Foreign Application Priority Data

Mar. 3, 1989 [NL] Netherlands ............... 8900520

[51] Int. Cl.[5] ........................................... G01R 23/16
[52] U.S. Cl. ..................... 364/485; 364/554; 381/38; 324/76.13
[58] Field of Search ................ 364/554, 484, 485; 381/33, 48, 49, 50; 84/603, 607, 608, 681, 693; 324/76.13

[56] References Cited

U.S. PATENT DOCUMENTS

| | | | |
|---|---|---|---|
| 4,004,096 | 1/1977 | Bauer et al. | 381/49 |
| 4,230,012 | 10/1980 | Bommersbach et al. | 381/49 X |
| 4,384,335 | 5/1983 | Duifhuis et al. | 381/49 X |
| 4,486,900 | 12/1984 | Cox et al. | 381/38 |
| 4,510,840 | 4/1985 | Inami et al. | 84/477 R |
| 4,791,671 | 12/1988 | Willems | 381/49 |
| 4,945,568 | 7/1990 | Willems | 381/50 |
| 4,972,490 | 11/1990 | Thomson | 381/49 |

OTHER PUBLICATIONS

Duifhuis, H. et al. "Measurement of Pitch in Speech: An Implementation of Goldstein's Theory of Pitch Perception", *J. Acoustical Society of America*, vol. 71, No. 6, Jun. 1982, pp. 1568-1580.
Hermes, D. J. "Measurement of Pitch by Subharmonic Summation", *Journal Acoustical Society of America*, vol. 83, No. 1, Jan. 1988, 257-264.

*Primary Examiner*—Thomas G. Black
*Assistant Examiner*—Michael Zanelli
*Attorney, Agent, or Firm*—Steven R. Biren

[57] ABSTRACT

A method and an arrangement are described by means of which a pitch in a signal (s(t)) can be determined. In fact the probability density function (pdf) of the pitch is determined as a function of frequency. A pitch can then be derived from this probability density function. First a frequency spectrum A(f) is derived from a signal portion situated in a specific time interval T. Then, the probability contribution ($K_{1i}$, $K_{1j}$, ....) is determined for a number of frequency components ($f_i$, $f_j$, ...), stating the relative probability that a pitch at a frequency ($f_1$) is the result of a frequency component ($f_i$, $f_j$, ...). The probability contributions ($K_{1i}$, $K_{1j}$, ...) are multiplied by one another to obtain a probability density ($K_{f1}$). This procedure is iterated for successive frequencies ($f_2, \ldots$) to obtain at least a second probability density. The probability densities $K_{f1}$, $K_{f2}$, ... are each a measure of the relative probability that a pitch occurs at the frequencies $f_1, f_2, \ldots$, respectively. The probability density function (pdf) from which one or more pitches can be derived (FIG. 4 a) can be determined from the computed probability densities ($K_{f1}, K_{f2}, \ldots$).

6 Claims, 2 Drawing Sheets

METHOD AND ARRANGEMENT FOR DETERMINING SIGNAL PITCH

This is a continuation of application Ser. No. 07/939,386, filed Aug. 31, 1992, now abandoned which is a continuation of Ser. No. 07/487,462, filed Feb. 28, 1990, now abandoned.

BACKGROUND OF THE INVENTION

The invention relates to a method of determining a pitch in a signal, deriving from the signal a probability density function of the pitch as a function of frequency and subsequently determining the pitch from the probability density function, as well as an arrangement for implementing the method.

Such a method and arrangement are known from the publication "An optimum processor theory for the central formation of the pitch of complex tones" by J. L. Goldstein, J.A.S.A., Vol. 54, No. 6 (1973), pp. 1496–1516.

It is a known fact that persons are able to recognize different pitches in a complex tone. Experiments have shown that pitch is a non-deterministic, subjective magnitude which is to be modelled stochastically. For a sine tone the probability density function of the experienced pitch is unimodal. This is to mean that no more than one maximum is found in the curve. This probability density function can be modelled as a Gaussian curve having a mean value corresponding with the frequency of the sine tone and a specific standard deviation $\sigma$.

For a complex tone the situation is more complicated. Persons are able to perceive two kinds of pitches in a complex tone, depending on whether they perceive the sound as a whole (synthetic listening) or listen to the individual partial tones (analytic listening). In the case of synthetic listening we may hear pitches that correspond with frequencies that do not occur in the signal. These virtual pitches are described by a multimodal probability density function. If one takes, for example, a complex tone constituted by two sines having frequencies of 1200 Hz and 1400 Hz, one will not only perceive a pitch of 200 Hz (basic tone) but also pitches at 173 Hz and 236 Hz. In this case the probability density function is trimodal, thus has three maximums. This perceptive behavior is described among other things by the model for pitch perception proposed by Goldstein in his aforementioned article.

Goldstein's model is based on a stochastic formulation predicting the multimodal probability density function of the perceived virtual pitch. In his model each spectral component in the perceived signal is represented by a stochastic variable which has a Gaussian probability density function having a mean value corresponding with the frequency of the spectral component. The standard deviation of the probability density function is a free parameter of the model which function only depends on the spectral frequency. In Goldstein's model, when a complex tone is presented, a sample is determined from each Gaussian probability density function. With these samples a pattern recognizing means performs an estimate of the (lacking) basic tone. This process then results in a multimodal probability density function of the virtual pitch. Although the model can be employed reasonably well for describing the virtual pitch in signals, it does have Several serious disadvantages. For example, the probability density function can only be computed for signals constituted by no more than two sines. For signals constituted by more than two sines the probability density function can be determined only by means of a Monte Carlo simulation. The model can further be used only for determining the probability density function if one knows in what octave the pitch is located.

SUMMARY OF THE INVENTION

It is an object of the invention to provide a method as well as an arrangement which is able to compute the probability density function of the (virtual) pitch for compound signals and requires little computation time for determining this probability density function. One or more pitches of the signal together with their associated standard deviations can then be derived from the probability density function.

For this purpose the method is characterized in that:
(a) from a signal portion located in a specific time interval a frequency spectrum is derived from the signal portion located in the time interval, which frequency spectrum is constructed from samples situated at essentially equidistant frequency values in a specific first frequency interval,
(b) for a frequency value $f_1$ situated in a second frequency interval a probability contribution $K_{1i}$ is determined, being a magnitude which is the result of the presence of a frequency component in the frequency spectrum at $f_i$,
(c) the step (b) is iterated at least once to obtain at least a second probability contribution $K_{1j}$, due to the presence of at least a second frequency component in the frequency spectrum at $f_j$,
(d) at least the two probability contributions $K_{1i}$, $K_{1j}$ are multiplied by one another to obtain a probability density $K_{f1}$,
(e) the steps (b), (c) and (d) are iterated to obtain at least a second probability density $K_{f2}$, in that the probability densities $K_{f1}$, $K_{f2}$, . . . are each a measure of the relative probability that a pitch occurs at the frequency $f_1, f_2, \ldots$, respectively, and in that the probability contributions $K_{1i}$, $K_{1j}$, . . . are each a measure of the relative probability that a pitch at the frequency $f_1$ is the result of a frequency component or the frequency component $f_i$, $f_j$, . . . respectively,
(f) from the thus obtained probability densities $K_{f1}$, $K_{f2}$, . . . a probability density function of the pitch is derived as a function of frequency, from which probability density function a pitch is derived.

The invention is based on the conception that the probability density function of the virtual pitch can be determined directly on the basis of the stochastic representations of the spectral components in the signal. This renders the method rather robust and fast. This implies that less computation time is necessary than with the prior art method.

The method may further be characterized in that for determining the probability contribution $K_{1i}$ a probability density function $G(f, f_i, \sigma_i)$ is derived, having a mean value situated at frequency $f_i$ and a standard deviation $\sigma_i$, this probability density function being a representation of the human perception of a tone having the frequency $f_i$, in that from this probability density function $G(f, f_i, \sigma_i)$ a second probability density function $G'_n(f, f_i/n, \sigma_{in})$ is derived, having a mean value $f_i/n$ and a standard deviation $\sigma_{in}$, n being an integer and selected such that $f_i/n$ is nearest to $f_1$, and in that $K_{1i}$ is essentially taken to be equal to $G_n'(f_1, f_i/n, \sigma_{in})$. According to this method use is made of subharmonics of the spectral components in the signal, a stochastic representation for these subharmonics being used to obtain the probability contribution.

The arrangement for implementing the method, comprising an input terminal for receiving the signal, is characterized in that the input terminal is coupled to an input of a frequency analysis unit arranged for obtaining a frequency spectrum of the signal portion situated in the time interval, in that an output of the frequency analysis unit is coupled to an input of a unit arranged for determining the probability contributions $K_{1i}$, $K_{1j}$, ... $K_{2i}$, $K_{2j}$, ... and for transferring the probability contributions to an output coupled to an input of a multiplier unit, in that the multiplier unit is arranged for computing the probability densities $K_{f1}$, $K_{f2}$, ... from the respective probability contributions $K_{1i}$, $K_{1j}$, ... and $K_{2i}$, $K_{2j}$, ..., which probability densities $K_{f1}$, $K_{f2}$, ... are transferred to an output, in that this output is coupled to an input of a pitch determining means for determining a pitch from the probability density function pdf obtained from the probability densities $K_{f1}$, $K_{f2}$.

BRIEF DESCRIPTION OF THE DRAWING

The invention will be further explained with reference to the description and on the basis of the following drawing Figures, in which.

DESCRIPTION OF THE PREFERRED EMBODIMENT

Figure 1:
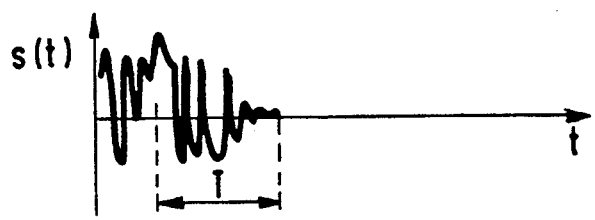
FIG. 1 shows, plotted against time, the signal in the time interval.

FIG. 1 shows a signal plotted against time. A speech signal may be concerned here. The signal may also be, for example, a musical signal, because man can also have a pitch perception with musical signals. The signal situated in a specific time interval T is sampled and digitized and, subsequently, the sampled and digitized signal is subjected to a Fourier transform, for example, a digital Fourier transform or fast Fourier transform.

Figure 2:
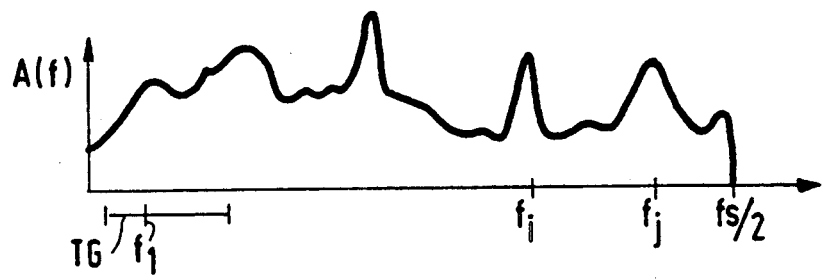
FIG. 2 shows the frequency spectrum of the signal.

FIG. 2 shows the frequency spectrum A(f) obtained from the Fourier transform. In fact, the frequency spectrum is not a continuous curve, but is constituted by frequency samples for frequency values m.Δf, where Δf=1/T and m varies from 1 to M, M being equal to, for example, 512 or 1024. In fact, M depends on the rate $f_s$ at which the signal s(t) is sampled, that is:

$M = T/2f_s$.

Figure 3A:
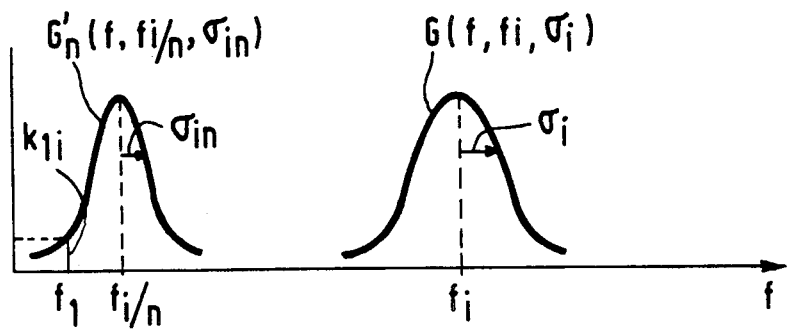
FIGS. 3a-3c show the computation of the probability contribution $K_{1i}$.

Then, in FIG. 3a, a frequency value $f_1$ is taken to be situated in a second frequency zone TG. The frequency zone TG need not of necessity be situated in the frequency zone in which the frequency spectrum A(f) for the signal has been determined. Now the probability contribution $K_{1i}$ is determined. The meaning of the concept of probability contribution will be explained hereinbelow. The probability contribution $K_{1i}$ is a result of the presence of a frequency component at the frequency $f_i$ in the spectrum A(f). If $f_1$ were situated in the frequency range of the spectrum A(f), $f_1$ need not of necessity coincide with one of the frequency components m.Δf in the spectrum.

Figure 3B:
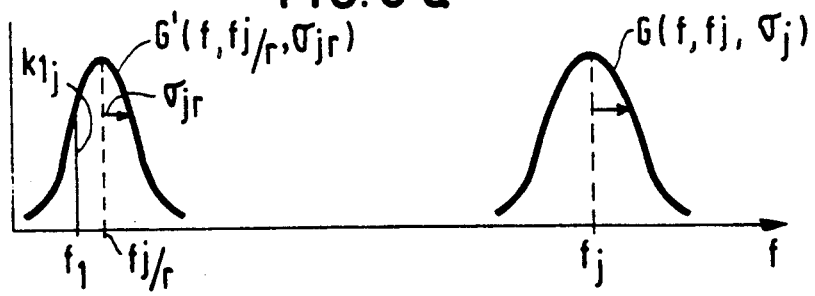

The manner in which $K_{1i}$ is determined will also be explained hereinbelow. Now the probability contribution $K_{1j}$ will be determined for the same frequency $f_1$. This probability contribution is a result of the presence of a frequency component at the frequency $f_j$ in the spectrum A(f). This is represented in FIG. 3b. Determining $K_{1j}$ is effected in the same manner as determining $K_{1i}$ (cf. below).

Determining the probability contribution for the frequency $f_1$ may be continued by taking into account a third and possibly even more frequency components $f_k$, $f_l$, ... (not shown) also situated in the frequency spectrum A(f).

The significance of the probability contributions may be explained as follows. The probability contributions $K_{1i}$, $K_{1j}$ ... may be considered a measure of the relative probability that a pitch at the frequency $f_1$ is the result of a frequency component at the frequency $f_i$, $f_j$, ... respectively. Let us assume, by way of example, that no more than two probability contributions $K_{1i}$ and $K_{1j}$ have been determined and that $K_i$=0.2 and $K_{1j}$=0.1. This implies that the probability that a pitch at the frequency $f_1$ is the result of the frequency component at $f_i$ is twice as large as the probability that the pitch at the frequency $f_1$ is the result of the frequency component at $f_j$.

The frequency components $f_i$, $f_j$ need not of necessity be successive frequency components in the spectrum A(f). It is alternatively possible to include only those frequency components from the frequency spectrum that have a large amplitude, since it may be assumed that the frequency components that have a large amplitude will most affect the probability contributions for a pitch situated at the frequency $f_1$.

The probability contributions $K_{1i}$ and $K_{1j}$ are multiplied by one another and, if more probability contributions $K_{1k}$, $K_{1l}$... had been determined (or will be determined), also multiplied by $K_{1k}$, $K_{1l}$... and so on.

The obtained product $K_{f1}$ is termed a probability density. The connotation of the concept of probability density will be explained hereinbelow.

Figure 3C:
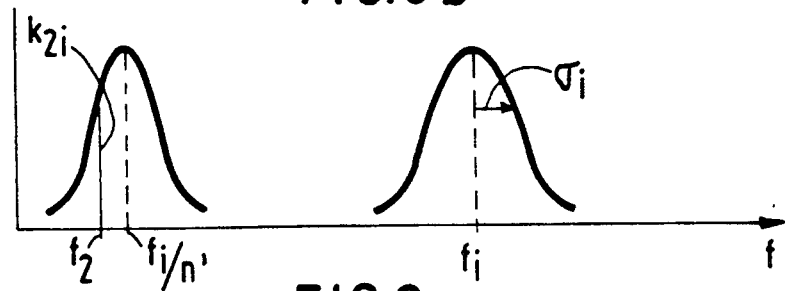

The procedure set out above will now be iterated for a second frequency $f_2$ situated in the second frequency zone TG. The probability contribution $K_{2i}$ will be determined. The probability contribution $K_{2i}$ is again the result of the presence of a frequency component at $f_i$ in the spectrum A(f). This is represented in FIG. 3c. A further explanation is to follow hereinbelow. No less than a second probability contribution $K_{2j}$ and possibly even more probability contributions $K_{2k}$, $K_{2l}$, etc will be determined.

Now again the probability contributions are multiplied by one another to obtain the product (the probability density) $K_{f2}$. For determining the probability contributions for the frequency $f_2$, preferably the same frequencies $f_i$, $f_j$, ... etc. are taken as those used for determining the probability contributions for the frequency $f_1$. However, this is not strictly necessary.

The procedure can be iterated for still further frequencies $f_3$, $f_4$, ... etc., situated in the interval TG in order to obtain the probability densities $K_{f3}$, $K_{f4}$.

The significance of the probability densities may be explained as follows. The probability densities $K_{f1}$, $K_{f2}$, ... may be considered a measure of the relative probability that a pitch occurs at the respective frequencies $f_1$, $f_2$. Let us assume, for example, that no more than two probability densities $K_{f1}$ and $K_{f2}$ have been determined and that $K_{f1}=0.02$ and $K_{f2}=0.01$. The meaning of this is that the probability that a pitch occurs at the frequency $f_1$ is twice as large as the probability that a pitch occurs at the frequency $f_2$.

It should be observed in this context that the order of the steps set out hereinbefore may be changed when necessary. Alternatively, it is possible to carry out several steps more or less in parallel.

For example, first all probability contributions $K_{1i}$, $K_{1j}, \ldots K_{2i}, K_{2j}, \ldots$ etc. may be determined and subsequent to this the probability densities $K_{f1}, K_{f2}$ etc. Needless to observe that it is equally possible to first compute the probability density $K_{f1}$ after the probability contributions $K_{1i}, K_{1j}$ have been determined, before proceesing to determine the probability contributions $K_{2j}, K_{2j}, \ldots$ etc.

Figure 4A:
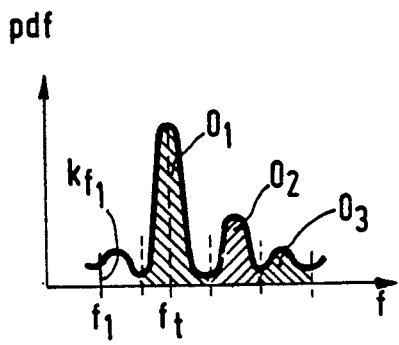
FIGS. 4a and 4b show two examples of the probability density function pdf of the pitch plotted against frequency.

All products $K_{f1}, K_{f2}, K_{f3}, \ldots$ etc. can now be plotted against frequency in FIG. 4a. So doing, after normalizing the surface underneath the obtained curve to 1, one will obtain the probability density function pdf of the pitch as a function of frequency. The pitch can now be derived from this probability density function pdf. For example, the absolute maximum in the curve can be determined. The frequency at which this maximum occurs can then be considered the pitch $f_t$ of the signal. The surface referenced $O_1$ may also be considered the probability that the frequency $f_t$ is the pitch of the signal.

A further possibility is to determine the surfaces $O_1$, $O_2$, $O_3$ (see FIG. 4a) underneath the pdf curve which are situated between each pair of adjacent relative minimums in the curve. The largest surface can then be determined. The frequency at which the maximum situated between the corresponding pair of minimums occurs may then be taken to be the pitch. The surface will then correspond with the probability that the frequency found is the pitch of the signal.

Subsequently, a new signal may be included and the procedure described hereinbefore may be iterated in its entirety for this new signal. In this manner the pitch variation of the signal as a function of time may be determined.

Figure 4B:
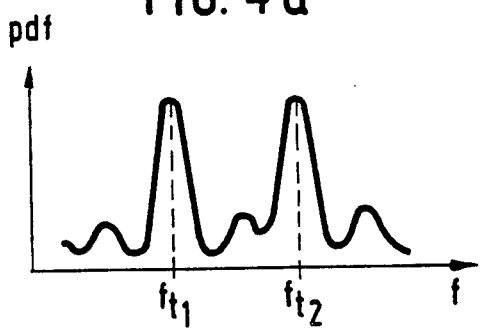

FIG. 4b shows a possibly different result for the probability density function pdi. In this Figure it is evident that there are two distinct peaks in the curve, situated at the frequencies $f_{t1}$ and $f_{t2}$. This could mean that the signal has two pitches at these frequencies $f_{t1}$ and $f_{t2}$.

The determination of the probability contribution $K_{1i}$ will now be further explained. In order to determine the probability contribution $K_{1i}$, see FIG. 3a, we assume a stochastic representation of the spectral component at the frequency $f_i$. This is shown in FIG. 3a means of the Gaussian curve $G(f, f_i, \sigma_i)$. These Gaussian curves are known from the literature, see for example the publication by Goldstein mentioned previously. The mean value is situated at the frequency $f_i$. The standard deviation $\sigma_i$ belonging to such Gaussian curves are extensively discussed in, i.a. the publication entitled "Frequency difference limens for short duration tones" by B. C. J. Moore in JASA 54 (1973), pp. 610–619.

Based on the Gaussian curve $G(f, f_i, \sigma_i)$ the curve $G_n(f, f_i/n, \sigma_{in})$ is now determined. For this purpose the subharmonic of $f_i$ is determined which is closest to the frequency $f_1$. This is the frequency $f_i/n$, n being an integer.

A numerical example: assume that $f_i=1200$ Hz and $f_1=145$ Hz. The subharmonic closest to 145 Hz has a frequency of 150 Hz. This means that n=8, because 1200/8 is 150 Hz.

The curve $G_n(f, f_i/n, \sigma_{in})$ is again a Gaussian curve having a mean value equal to the subharmonic frequency $f_i/n$ and a standard deviation $\sigma_{in}$, which may be determined as follows:

$$\sigma_{in}=\sigma_i/(n)^\alpha$$

with $\alpha \leq 1$, being a free parameter in the model as a result of which the model can be fitted to psychoacoustic data. The surface underneath Gaussian curve $G_n$ is equal to 1. The Gaussian curve $G_n$ is then scaled by a factor $(\beta)^n$, where $\beta \leq 1$ and is a free parameter or, worded differently:

$$G_n'=(\beta)^n \cdot G_n.$$

The probability contribution $K_{1i}$ can now be derived from the curve $G_n'(f, f_i/n, \sigma_{in})$. For that matter, $K_{1i}$ is now equal to $G_n'(f_1, f_i/n, \sigma_{in}$. The Gaussian curves $G$ taken as a basis may be pre-scaled by an amplitude factor $H(A(f_i))$. This amplitude factor then in fact indicates to what extent the probability contribution $K_{1i}$ depends on the amplitude of the frequency component at $f_i$. The further probability contributions may be derived in the same way.

Figure 5:
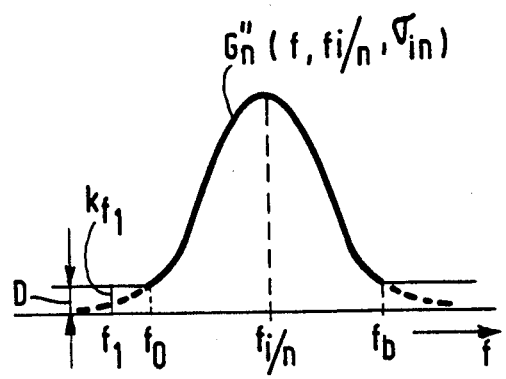
FIG. 5 shows a further example of the second probability density function.

FIG. 5 shows a different possibility for the Gaussian curve $G_n'(f, f_i/n, \sigma_{in})$ referenced $G_n''(f, f_i/n, \sigma_{in})$ here. For frequencies below $f_O$ and above $f_b$ the Gaussian curve is shown here by means of a broken line. The Gaussian curve is smaller than a specific threshold value D. In order to determine the probability contribution $K_{1i}$ for these frequencies the Gaussian curve $G_n''$ is assumed to be equal to the threshold D. Thus, if the position of $f_1$ is as shown in FIG. 5, $K_{1i}$ will be equal to D. The threshold value is a free parameter in the model.

Figure 6:
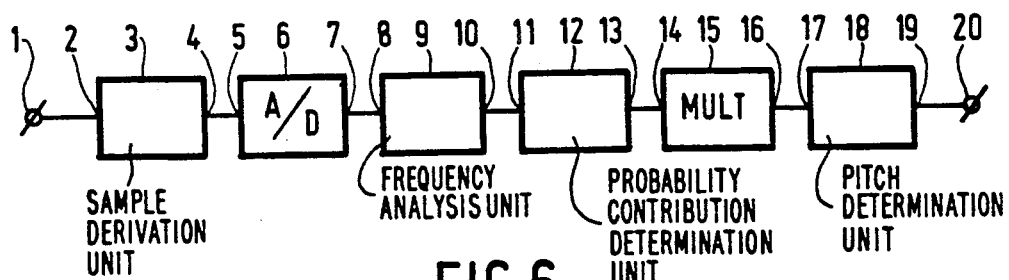
FIG. 6 shows an arrangement for implementing the method.

FIG. 6 shows an arrangement for implementing the method. The signal s(t) of FIG. 1 is applied to an input terminal 1. This terminal is coupled to an input 2 of a unit 3. The unit 3 derives the samples from the signal portion s(t) situated in the time interval T. Through output 4 the samples are applied to input 5 of an analog-to-digital converter 6, where the samples are digitized. The digitized samples are applied through output 7 to the input 8 of a frequency analysis unit 9. The analysis unit 9 determines the frequency spectrum A(f), compare FIG. 2. Through the output 10 this frequency spectrum is applied to a second unit 12. In the unit 12 the probability contributions $K_{1i}, K_{1j}, \ldots K_{2i}, K_{2j}, \ldots$ are determined, compare FIG. 3. Through the output 13 these probability contributions are applied to the input 14 of a multiplication unit 15 in which the probability contributions are multiplied by one another in order to obtain the probability density function pdf, compare FIG. 4.

This probability density function pdf is applied through the output 16 to the input of a pitch determining means 18 where the pitch $f_t$ is derived from the probability density function pdf. Through the output 19 this pitch is applied to the output terminal 20 of this arrangement.

By letting the arrangement process the signal in consecutive time intervals, at output terminal 20 the pitch of the signal will be represented as a function of time.

It should be observed that the invention is not restricted to that which has been described hereinbefore with reference to the drawing. The invention likewise applies to the exemplary embodiments that differ from the embodiments discussed as regards items not relating to this invention.

I claim:

1. A method for determining an associated pitch frequency in a received compound audio signal, said method comprising the steps of:

deriving a frequency spectrum from said audio signal, within a predetermined frequency range, said spectrum having a frequency-dependent amplitude and an upper frequency bound;

selecting a plurality of predominant spectral parts each having a respective central frequency ($f_i$, $f_j$) and an associated amplitude;

for each of a plurality of respective target frequencies ($f_1$, $f_2$) that are low in frequency with respect to said upper frequency bound:

(a) determining a probability contribution ($K_{1,1}$, $K_{1,2}$, ...) for the target frequency in question for each said predominant spectral part; and (b) multiplying all probability contributions for the target frequency in question to produce a probability density function value;

deriving said pitch frequency from a probability density function represented by all probability density function values so generated; and generating an output signal representative of said pitch frequency.

2. A method as claimed in claim 1, wherein said probability contribution is obtained through a Gaussian mapping function that has its peak at a subharmonic of the central frequency in question which subharmonic is nearest to the target frequency in question.

3. A method as claimed in claim 2, wherein said Gaussian mapping function upon scoring below a predetermined lower bound value is normalized to that lower bound value.

4. A device for determining an associated pitch frequency in a received compound audio signal, said apparatus comprising:

input means for receiving said audio signal;

frequency spectrum determining means fed by said input means for, within a predetermined frequency range, deriving from said audio signal a frequency spectrum with a frequency dependent amplitude and an upper frequency bound;

selection means fed by said determining means for selecting a plurality of predominant spectral parts in said spectrum, each having a respective central frequency ($f_i$, $f_j$) and an associated amplitude;

multiplying means, fed by said selection means, for, with respect to each of a plurality of respective target frequencies ($f_1$, $f_2$) that are low with respect to said upper frequency bound:

(a) determining a probability contribution ($K_{1,1}$, $K_{1,2}$, ...) for the target frequency in question for each said predominant spectral part; and (b) multiplying all probability contributions for the target frequency in question to produce a probability density function value;

pitch deriving means fed by said multiplying means for deriving said pitch frequency from a probability density function represented by all probability density function values so generated; and output means fed by said pitch deriving means for generating an output signal representative of said pitch derived frequency.

5. A device as claimed in claim 4, wherein said probability contribution is obtained through a Gaussian mapping function that has its peak at a subharmonic of the central frequency in question, which subharmonic is nearest to the target frequency in question.

6. A device as claimed in claim 5, wherein said Gaussian mapping functions upon scoring below a predetermined lower bound value, is normalized to that lower bound value.

* * * * *